United States Patent
Yoda

(10) Patent No.: US 8,149,280 B2
(45) Date of Patent: Apr. 3, 2012

(54) FACE DETECTION IMAGE PROCESSING DEVICE, CAMERA DEVICE, IMAGE PROCESSING METHOD, AND PROGRAM

(75) Inventor: Koji Yoda, Kanagawa (JP)

(73) Assignee: Sony Corporation, Tokyo (JP)

( * ) Notice: Subject to any disclaimer, the term of this patent is extended or adjusted under 35 U.S.C. 154(b) by 466 days.

(21) Appl. No.: 12/364,121

(22) Filed: Feb. 2, 2009

(65) Prior Publication Data

US 2009/0207266 A1    Aug. 20, 2009

(30) Foreign Application Priority Data

Feb. 15, 2008   (JP) ................................ 2008-034294

(51) Int. Cl.
*H04N 5/225* (2006.01)
*H04N 5/228* (2006.01)

(52) U.S. Cl. ............... 348/207.1; 348/222.1; 348/223.1; 382/162

(58) Field of Classification Search ............. 348/207.1, 348/222.1, 223.1, 239
See application file for complete search history.

(56) References Cited

U.S. PATENT DOCUMENTS

| | | | | |
|---|---|---|---|---|
| 4,951,140 A * | 8/1990 | Ueno et al. | ................. | 348/413.1 |
| 7,734,098 B2 * | 6/2010 | Kikkawa et al. | ............. | 382/195 |
| 2006/0120572 A1 * | 6/2006 | Li et al. | ..................... | 382/118 |
| 2006/0126938 A1 * | 6/2006 | Lee et al. | ...................... | 382/190 |
| 2008/0170132 A1 * | 7/2008 | Yi et al. | ...................... | 348/222.1 |
| 2008/0285849 A1 * | 11/2008 | Lu et al. | ......................... | 382/166 |
| 2009/0180696 A1 * | 7/2009 | Minato et al. | ................ | 382/195 |

FOREIGN PATENT DOCUMENTS

| | | |
|---|---|---|
| JP | 11-284874 | 10/1999 |
| JP | 2001-357404 | 12/2001 |
| JP | 2005-070850 | 3/2005 |
| JP | 2005-285035 | 10/2005 |
| JP | 2006-202184 | 8/2006 |
| JP | 2007-025767 | 2/2007 |
| JP | 2007-025935 | 2/2007 |
| JP | 2007-259423 | 10/2007 |
| JP | 2008-035125 | 2/2008 |

OTHER PUBLICATIONS

Japanese Patent Office Action corresponding to Japanese Serial No. 2008-034294 dated Mar. 9, 2010.
Japanese Patent Office Action corresponding to Japanese Serial No. 2008-034294 dated Dec. 15, 2009.

* cited by examiner

*Primary Examiner* — Hung Lam
(74) *Attorney, Agent, or Firm* — SNR Denton US LLP

(57) ABSTRACT

Disclosed herein is an image processing device including: a face detector configured to detect a face from an image given on a basis of detection information; and a processing unit configured to set the detection information of the face detector, receive at least an input image before distortion correction of the image before the distortion correction and an image after the distortion correction, divide an entire image region of the input image, and supply each of the divided images to the face detector on a time-division basis, wherein the face detector detects faces from a face of a maximum size to a face of a minimum size in the entire image in a detectable range.

20 Claims, 11 Drawing Sheets

REDUCTION RATIO DEPENDS ON SIZE OF ORIGINAL
IMAGE AND IMAGE SIZE PROCESSIBLE BY FACE DETECTOR

FACE DETECTION IMAGE PROCESSING DEVICE, CAMERA DEVICE, IMAGE PROCESSING METHOD, AND PROGRAM

CROSS REFERENCES TO RELATED APPLICATIONS

The present invention contains subject matter related to Japanese Patent Application JP 2008-034294 filed in the Japan Patent Office on Feb. 15, 2008, the entire contents of which being incorporated herein by reference.

BACKGROUND OF THE INVENTION

1. Field of the Invention

The present invention relates to an image processing device that detects a face from a picked-up image and which has a function of correcting distortion of the image, a camera device, an image processing method, and a program.

2. Description of the Related Art

Camera devices including a face detector that detects the face of a subject from an image picked up by an image pickup element (imaging sensor) have been put to practical use.

Such camera devices generally often use an image obtained by reducing an image picked up by the imaging sensor as an image supplied to the face detector.

In addition, the detection of a face in the face detector is generally often slower than a frame rate at which image pickup is performed by the imaging sensor, and a result of the detection from the face detector is delayed information a few frames before an image picked up actually (in real time).

SUMMARY OF THE INVENTION

The above-described techniques generally often use an image obtained by reducing an image picked up by the imaging sensor as an image supplied to the face detector. However, for example, in an image picked up at a wide angle using a wide-angle lens, an image of a subject is picked up in a small size, and an image of a face is naturally picked up in a small size.

Thus, when an entire image region obtained by wide-angle image pickup is reduced and then supplied to the face detector, there is a disadvantage of being able to detect only faces in a rather close range from the camera device.

For example, when a subject for image pickup has a wide width as in the case of a group photograph or the like taken by an ordinary digital still camera (DSC) or the like, a distance to the subject naturally needs to be long (separated) because of a narrow lens angle of view.

At this time, faces, which are similarly a subject, cannot be detected.

In the above-described case, enlarging the image to be supplied to the face detector may be considered. However, a need to increase the capacity of an image memory for face detection arises, resulting in an increase in cost.

In addition, at this time, a time to search for faces is increased exponentially by an amount corresponding to the increase in the capacity of the image memory for face detection, and consequently a detection time is increased.

In addition, changing a minimum detection face size of the face detector to detect smaller faces may be considered.

However, there is generally a limit to the detection of faces of small size, and consequently faces of small size are often undetectable.

In addition, as described above, the detection of a face in the face detector is generally often slower than a frame rate at which image pickup is performed by the imaging sensor, and a result of the detection from the face detector is delayed information a few frames before an image picked up actually (in real time).

Thus, when a person as a subject is moving, or when a person performing image pickup is moving, exposure control (AE (automatic exposure), backlight correction and the like) using the result of the face detection cannot be performed properly, so that a disadvantage results in that provisions are mainly made for still-image uses only.

Implementing a plurality of face detectors to shorten a face detection time may also be considered, but increases system cost.

It is desirable to provide an image processing device, a camera device, an image processing method, and a program that enable face detection covering all face sizes detectable by a face detector without inviting an increase in cost, enable exposure control not depending on face size, and in turn enable an improvement in image quality.

According to a first embodiment of the present invention, there is provided an image processing device including: a face detector configured to detect a face from an image given on a basis of detection information; and a processing unit configured to set the detection information of the face detector, receive at least an input image before distortion correction of the image before the distortion correction and an image after the distortion correction, divide an entire image region of the input image, and supply each of the divided images to the face detector on a time-division basis; wherein the face detector detects faces from a face of a maximum size to a face of a minimum size in the entire image in a detectable range.

Preferably, the processing unit divides the entire image region so as to have an image overlap region on a division boundary line.

Preferably, the processing unit sets the detection information including face sizes in the face detector such that detected face sizes are prevented from coinciding with each other between divided and reduced images.

Preferably, the processing unit performs control for a detected face so as to detect only a peripheral image region of the face on a basis of face detection result information obtained by the face detector.

Preferably, the processing unit has a function of setting a region for detecting a face to a range proportional to size of the face.

Preferably, the processing unit has a function of setting a region for the face detector to detect a face to a range in consideration of an amount of movement estimated from a positional relation of the face in a past.

Preferably, the processing unit controls the face detector to detect motion in the entire image region and detect a face within only a region where the motion occurs as an object.

According to a second embodiment of the present invention, there is provided a camera device including: an image pickup element; an optical system for forming an image of a subject on the image pickup element; and an image processing device capable of subjecting an original image picked up with a wide-angle lens by the image pickup element to distortion correction using a distortion correcting parameter; wherein the image processing device includes a face detector configured to detect a face from an image given on a basis of detection information, and a processing unit configured to set the detection information of the face detector, receive at least an input image before distortion correction of the image before the distortion correction and an image after the distortion correction, divide an entire image region of the input image, and suppl each of the divided images to the face detector on a time-division basis, and the face detector detects faces from a face of a maximum size to a face of a minimum size in the entire image in a detectable range.

According to a third embodiment of the present invention, there is provided an image processing method for detecting a face from an image given on a basis of detection information set in a face detector, the image processing method including the steps of: setting the detection information; dividing at least an entire image region before distortion correction of images before the distortion correction and after the distortion correction; and supplying each of the divided images to the face detector on a time-division basis; wherein the face detector detects faces from a face of a maximum size to a face of a minimum size in the entire image in a detectable range.

According to a fourth embodiment of the present invention, there is provided a program for making a computer perform image processing for detecting a face from an image given on a basis of detection information set in a face detector, the image processing including: a step of setting the detection information; a step of dividing at least an entire image region before distortion correction of images before the distortion correction and after the distortion correction; and a step of supplying each of the divided images to the face detector on a time-division basis; wherein the face detector detects faces from a face of a maximum size to a face of a minimum size in the entire image in a detectable range.

According to the present invention, the processing unit sets the detection information in the face detector.

Then, the processing unit for example divides an entire image region before distortion correction, and supplies each of the divided images to the face detector on a time-division basis.

Then, the face detector detects faces from a face of a maximum size to a face of a minimum size in the entire image in a detectable range.

According to the present invention, it is possible to perform face detection covering all face sizes detectable by a face detector without inviting an increase in cost.

Because faces of small size can be detected, it is possible to perform exposure control not depending on face size, and thus achieve an improvement in image quality.

DETAILED DESCRIPTION OF THE PREFERRED EMBODIMENTS

Preferred embodiments of the present invention will hereinafter be described with reference to the drawings.

Figure 1:
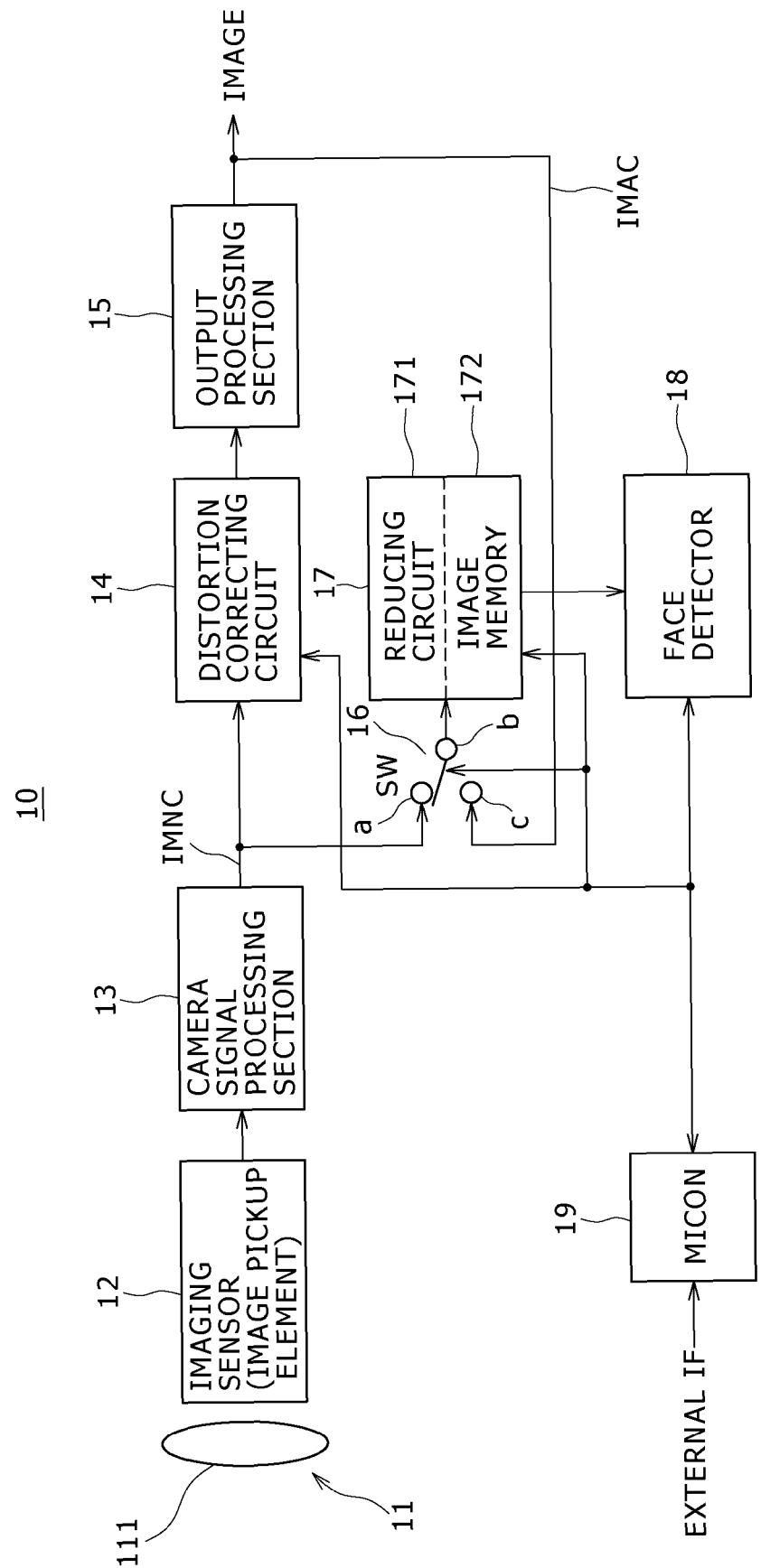
FIG. 1 is a block diagram showing an example of configuration of a camera device employing an image processing device according to an embodiment of the present invention.

FIG. 1 is a block diagram showing an example of configuration of a camera device employing an image processing device according to an embodiment of the present invention.

As shown in FIG. 1, the camera device 10 according to the present embodiment includes an optical system 11, an image pickup element (imaging sensor) 12, a camera signal processing section 13, a distortion correcting circuit 14, an output processing section 15, a switch 16, a reducing circuit and image memory 17, a face detector 18, and a microcomputer (micon) 19 as a controlling section.

Of these constituent elements, the switch 16, the reducing circuit and image memory 17, and the microcomputer 19 form a processing unit of an image processing device.

Incidentally, in the present embodiment, a distortion correcting parameter in lens distortion aberration will be referred to simply as a distortion correcting parameter.

The camera device 10 according to the present embodiment has a controlling function (algorithm) of detecting a face in the face detector 18 on the basis of an image picked up by a wide-angle lens. The camera device 10 divides the picked-up image before distortion correction and controls the face detector 18 on a time-division basis, and thereafter cuts out an image before distortion correction on the basis of a detected face and controls the face detector 18.

In addition, the camera device 10 has a function of performing the above-described face detection with a region where motion is detected as an object.

In addition, the camera device 10 has a function of, when detecting a face from a picked-up image before distortion correction, thereafter performing face detection in an image after the distortion correction in some cases.

The camera device 10 having these functions is configured as a camera capable of detecting a face from an entire image region before distortion correction which image is picked up by a wide-angle lens and capable of detecting a face also from an image after the distortion correction.

The camera device 10 according to the present embodiment has a function of performing electronic cutout (a pan, a tilt, and a zoom), synthesis and the like while correcting the distortion of an image obtained by wide-angle image pickup by using a distortion correcting parameter.

At this time, the microcomputer 19 may have the distortion correcting parameter stored in advance in a memory such as a built-in ROM (read only memory)/RAM (random access memory) or the like, may obtain the distortion correcting parameter by an operation of the microcomputer 19, or can be configured to receive the distortion correcting parameter by external communication from a host computer (not shown) to which the camera device 10 is connected through a transmission line.

The optical system 11 includes a wide-angle lens 111 formed by a super-wide-angle lens, for example, and forms a subject image through the wide-angle lens 111 on an image pickup surface of the image pickup element 12.

The image pickup element 12 is for example formed by an imaging sensor, which is a CCD (Charge Coupled Device) or CMOS (Complementary Metal Oxide Semiconductor) device.

The image pickup element 12 detects the subject image through the optical system 11 by optical sensors arranged in the form of a matrix on a semiconductor substrate, generates a signal charge, reads the signal charge via a vertical signal line and a horizontal signal line, and then outputs a digital image signal of the subject to the camera signal processing section 13.

The camera signal processing section 13 subjects the digital image signal to color interpolation, a white balance, YCbCr conversion processing, compression, filing, and the like, and then outputs the digital image signal as an image without distortion correction (hereinafter referred to as an original image) IMNC to the distortion correcting circuit 14 and to the reducing circuit and image memory 17 via the switch 16.

The distortion correcting circuit 14 subjects the original image IMNC from the camera signal processing section 13 to distortion correction by the distortion correcting parameter, and then outputs the result to the output processing section 15.

The output processing section 15 performs gamma processing, mask processing, format conversion and the like on the image data obtained by subjecting the original image IMNC to the distortion correction, cutout, synthesis and the like, which image data is output from the distortion correcting circuit 14. The output processing section 15 outputs the result to the outside, and also outputs the result as an image IMAC after the correction to the switch 16.

The switch 16 has a contact a connected to an output part of the camera signal processing section 13, a contact c connected to an output part of the output processing section 15, and a contact b connected to an input part of the reducing circuit and image memory 17.

The switch 16 under control of the microcomputer 19 inputs the original image (image not corrected for distortion) by the camera signal processing section 13 or the image corrected for distortion by the output processing section 15 to the reducing circuit and image memory 17.

The reducing circuit and image memory 17 has a reducing circuit 171 and an image memory 172.

The reducing circuit 171 stores in the image memory 172 an image obtained by reducing an entire region or a divided and cut-out region in the original image (image not corrected for distortion) by the camera signal processing section 13 or the image corrected for distortion by the output processing section 15, which image is input via the switch 16, at an arbitrary reduction ratio, or an image obtained by dividing and simply cutting out a region.

The reducing circuit 171 divides the entire image region of the original image IMNC before the distortion correction or the image IMAC after the distortion correction (4/9/16/25/36-part division or the like) using information for setting divided and cut-out regions of an image and information on the reduction ratio which information is set by the microcomputer 19. The reducing circuit 171 supplies each of the divided images to the face detector 18 on a time-division basis.

Incidentally, at this time, image size after the reduction can be processed by the face detector 18.

The face detector 18 detects a face on the basis of the image stored within the image memory 172, using information on face size to be detected, a region or the like which information is set by the microcomputer 19.

Incidentally, the face detector 18 may be implemented by either of software and hardware, and an algorithm, a circuit configuration and the like of the face detector 18 may be a publicly known or existing one.

The microcomputer 19 has a function of supplying the distortion correcting parameter indicating an original image part to be corrected for distortion to the distortion correcting circuit 14, and thereby controlling the distortion correction on the original image.

In addition, the microcomputer 19 has a function of controlling selection of the switch 16, setting regions to be divided and cut out in an image and setting the reduction ratio in the reducing circuit 171, and thereby controlling image division and cutout processing and reduction processing.

The microcomputer 19 has a function of setting face size to be detected, a region and the like in the face detector 18, and thereby controlling face detection processing. The microcomputer 19 obtains a result of detection of a position, face size and the like.

The microcomputer 19 controls the switch 16, the reducing circuit and image memory 17, and the face detector 18 so as to perform detection covering all faces from a face of a maximum size to a face of a minimum size (in a detectable range of the face detector 18) in all images before the distortion correction or after the correction by dividing the entire image region before the distortion correction or after the distortion correction (4/9/16/25/36-part division or the like) and supplying each of the divided images to the face detector 18 on a time-division basis.

The microcomputer 19 performs control so that even when there is a face on a division boundary line, the face can be detected, by having an overlap region when making the division.

The microcomputer 19 performs control so as to be able to shorten a detection time by setting the face detector 18 such that face sizes detected in the face detector 18 do not coincide with each other between divided and reduced images.

The microcomputer 19 has a function of performing control so as to shorten a detection time for a once detected face by thereafter detecting only a peripheral image region of the face for the detected face on the basis of face detection result information obtained by the face detector 18.

In this case, the microcomputer 19 has a function of setting the detected region to a range proportional to the size of the face.

In addition, the microcomputer 19 has a function of estimating an amount of movement from positional relation of the face in the past in the detected region, and setting the detected region to a range in consideration of the amount of movement.

In addition, the microcomputer 19 has a function of performing control so as to shorten a detection time by detecting motion in the entire image region before the distortion correction or after the distortion correction and detecting a face with only a region where the motion occurs as an object.

Incidentally, in this case, a result of the motion detection (a motion vector or the like) is not used for face detection.

More concrete description will be made below of the face detecting function for an image obtained by wide-angle image pickup according to the present embodiment, picked-up images and the like.

A summary (outline) of face detection will first be described with reference to FIG. 2 and FIG. 3.

<Summary of Face Detection>

Figure 2:
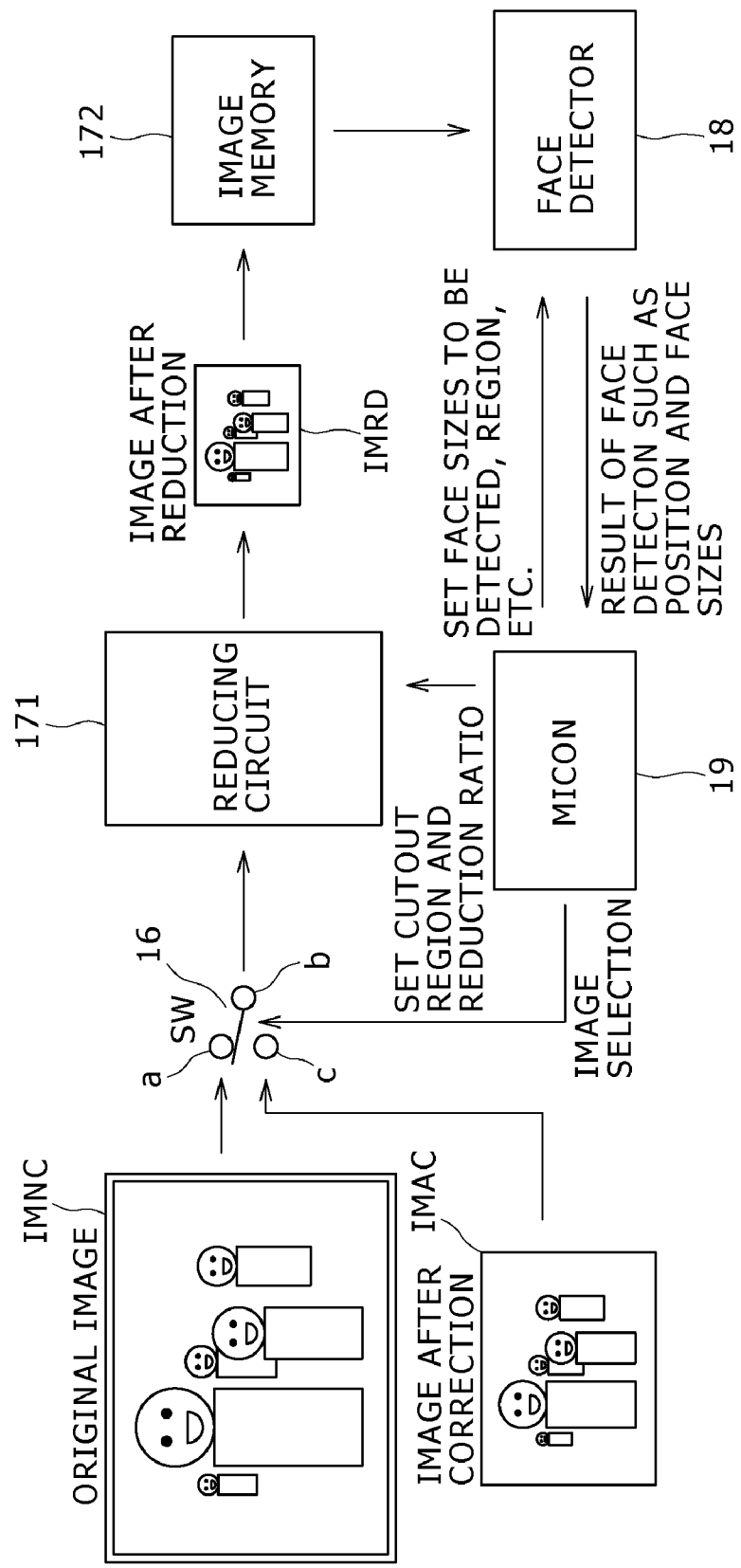
FIG. 2 is a diagram schematically showing images in face detection and a control flow.

FIG. 2 is a diagram schematically showing images in face detection and a control flow. FIG. 3 is a diagram showing an example of setting a detection region and face sizes to be detected by the microcomputer.

The number of pixels of the original image IMNC output from the camera signal processing section 13 is generally larger than the number of pixels of the image memory 172 for face detection.

Thus, in order to make the number of pixels of the original image IMNC coincide with the number of pixels of the image memory 172 for face detection, the original image IMNC is reduced, and the reduced image IMRD is stored in the image memory for face detection.

Incidentally, in general, the number of pixels of the image memory 172 for face detection is often fixed irrespective of the number of pixels of the imaging sensor 12 or the number of pixels of the original image IMNC output from the camera signal processing section 13.

This is because when the angle of view of a lens is the same, there is no difference in region (angle of view) itself obtained by image pickup between an image picked up by the imaging sensor 12 and the original image IMNC output from the camera signal processing section, there is simply a difference in resolution therebetween, and the difference becomes substantially zero on the image reduced and stored in the image memory 172 for face detection.

Figure 3:
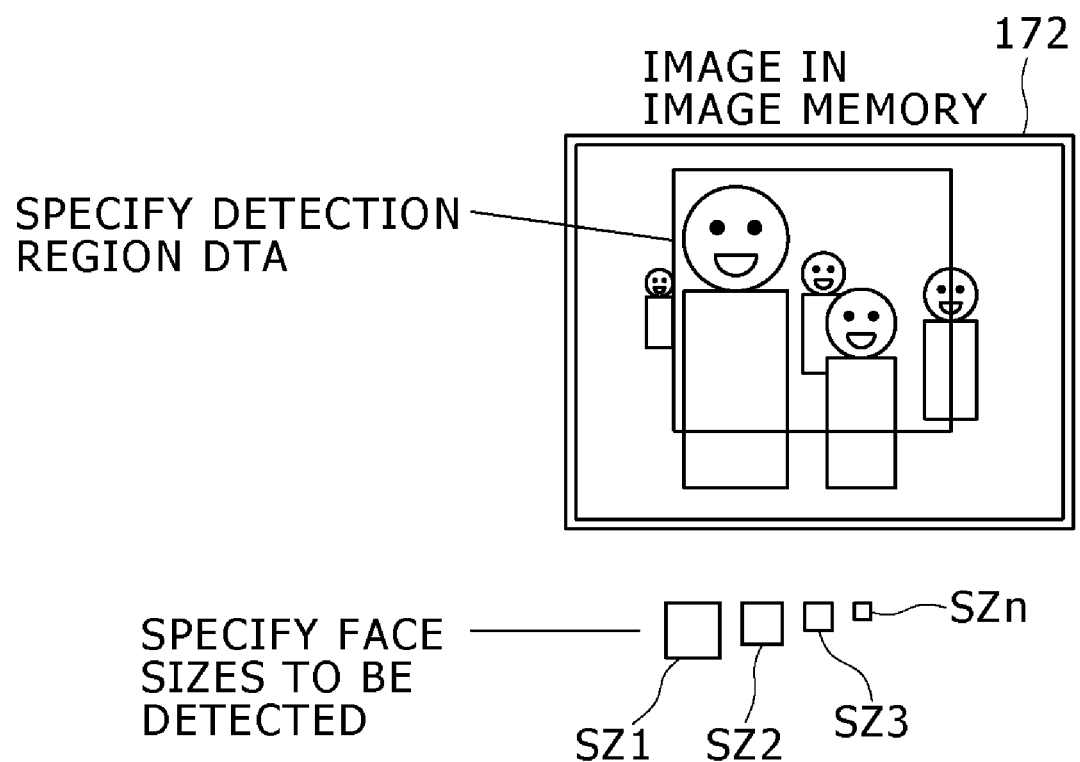
FIG. 3 is a diagram showing an example of setting a detection region and face sizes to be detected by a microcomputer.

As shown in FIG. 3, the microcomputer 19 sets a detection region DTA for the image memory 172 for face detection, face sizes SZ1 to SZn to be detected, and the like in the face detector 18, and thereafter makes the face detector 18 start detection.

Incidentally, at this time, because a plurality of detection regions and face sizes can generally be specified in many cases, the face detector 18 allows these specifications to be performed consecutively.

The face detector 18 performs face detection from an image within the image memory 172 for face detection according to the set detection region DTA, the face sizes SZ (1 to n) to be detected, and the like. After completing the detection, the face detector 18 outputs a position within the image memory 172 for face detection and face size information after the face detection to the microcomputer 19.

Alternatively, the microcomputer 19 reads the position within the image memory 172 and the face size information.

Incidentally, as shown earlier, the face detector 18 may be implemented by either of software and hardware, and an algorithm, a circuit configuration and the like of the face detector 18 may be a publicly known or existing one.

In this case, the face detector 18 is only shown as an example for deepening understanding of contents to be described later.

An image picked up at a standard angle of view and an image picked up at a wide angle will next be described with reference to FIG. 4 and FIG. 5.

<Image Picked Up at Standard Angle of View and Image Picked Up at Wide Angle>

Figure 4:
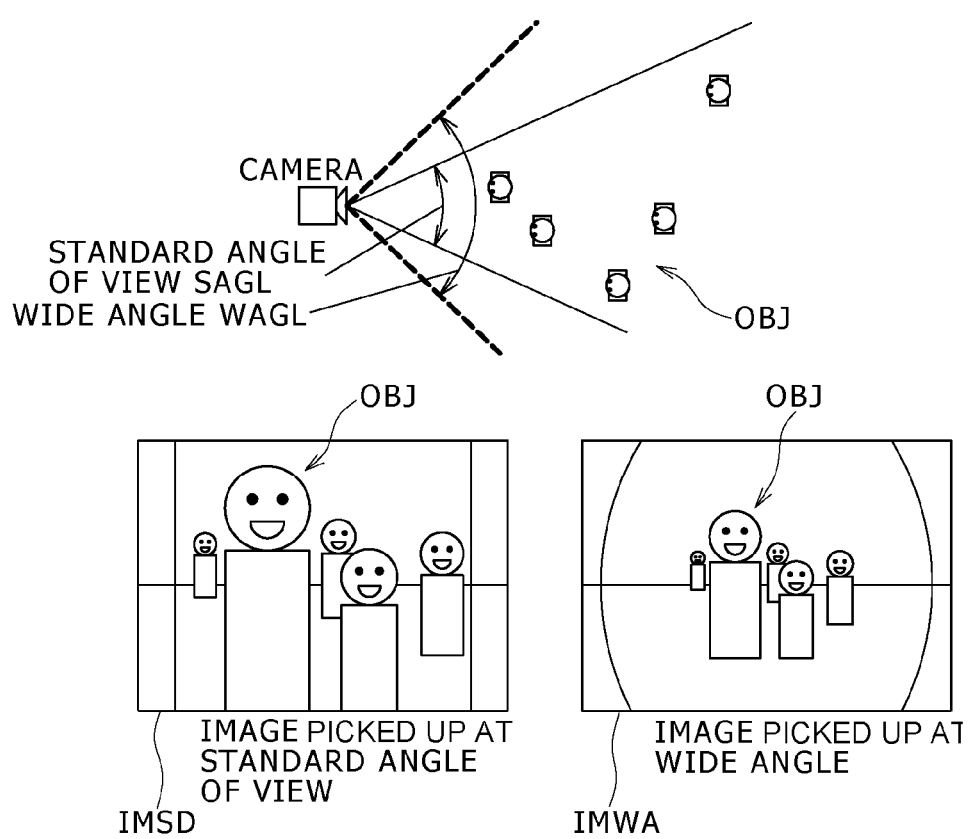
FIG. 4 is a diagram showing an example of an image picked up at a standard angle of view and an image picked up at a wide angle.

FIG. 4 is a diagram showing an example of an image picked up at a standard angle of view and an image picked up at a wide angle.

Figure 5:
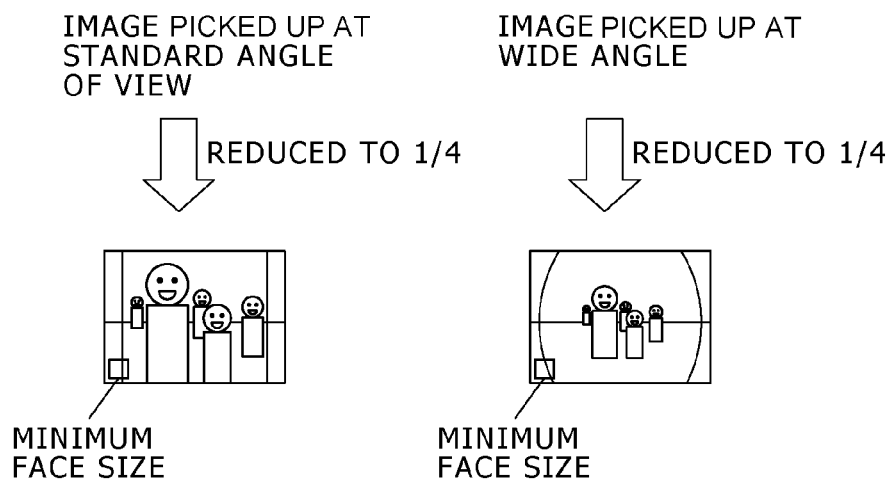
FIG. 5 is a diagram showing an example of the image picked up at the standard angle of view and the image picked up at the wide angle when face detection is performed.

FIG. 5 is a diagram showing an example of the image picked up at the standard angle of view and the image picked up at the wide angle when face detection is performed.

As shown in FIG. 4, in the image IMWA picked up at the wide angle, an image of a subject OBJ is picked up in a small size, and an image of a face is naturally picked up in a small size.

Thus, even with a same system configuration (the size of the original image, the reduction ratio of the reducing circuit, and the face detector), face sizes detectable in the image IMSD picked up at the standard angle of view may not be detectable in wide-angle image pickup.

FIG. 5 shows an example when face detection is performed.

Incidentally, while the reduction ratio (ratio of the number of pixels) in the reducing circuit 171 is ¼ as an example in FIG. 5, it is needless to say that the actual reduction ratio is determined by a ratio between the number of pixels of the original image IMNC being used and the number of pixels of an image that can be processed by the face detector 18.

A method of detecting all faces from a face of a maximum size to a face of a minimum size will next be described with reference to FIG. 6.

<First Method: Method of Detecting All Faces from Face of Maximum Size to Face of Minimum Size>

Figure 6:
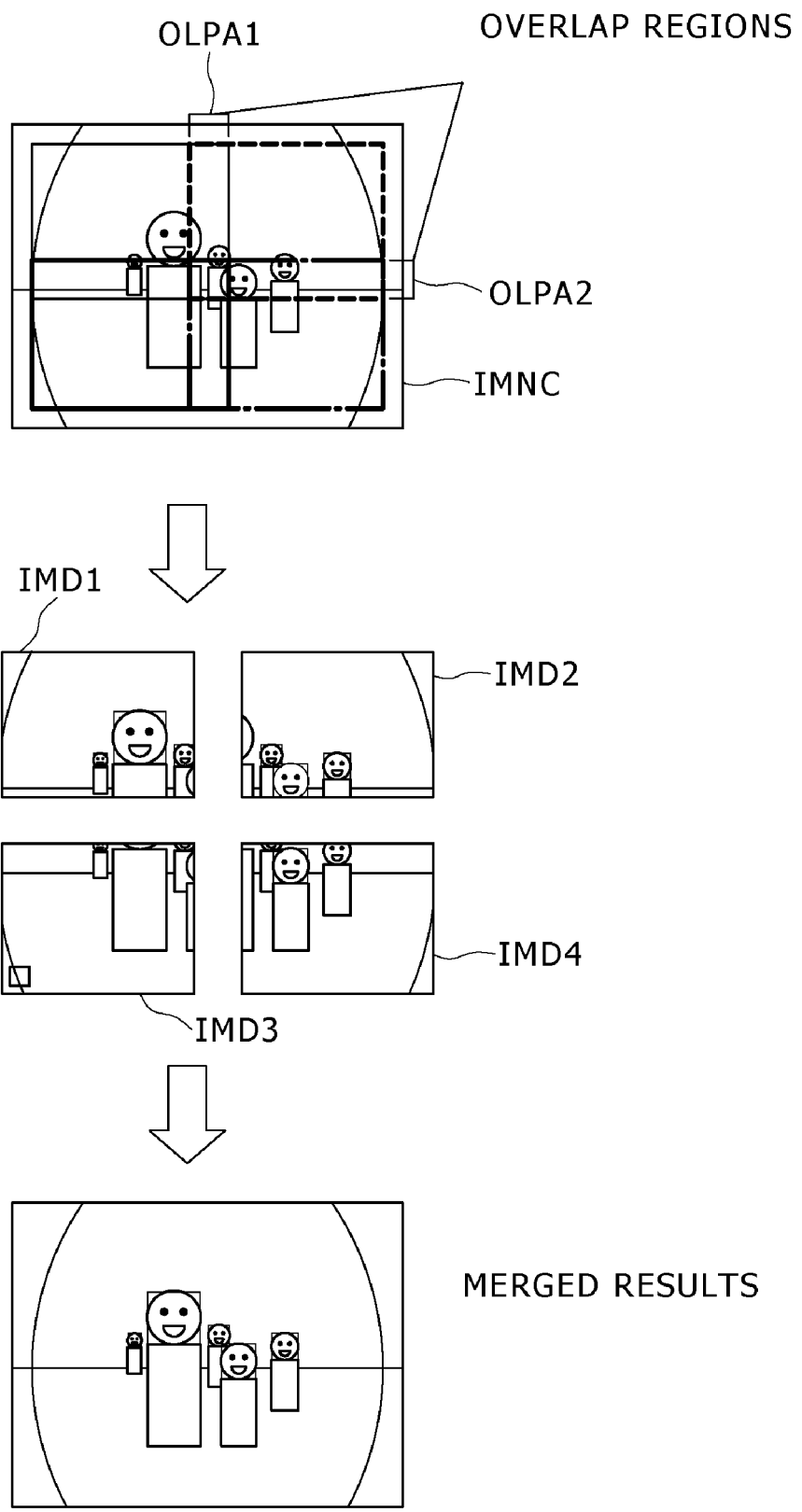
FIG. 6 is a diagram of assistance in explaining a method of detecting all faces from a face of a maximum size to a face of a minimum size.

FIG. 6 is a diagram of assistance in explaining a method of detecting all faces from a face of a maximum size to a face of a minimum size.

The entire image of the original image IMNC is divided (1/4/9/16/25-part division or the like) (4-part division in the example of FIG. 6). The reducing circuit 171 reduces each of the divided images IMD1 to IMD4 to a number of pixels that can be processed by the face detector 18 on a time-division basis, and then supplies the result to the face detector 18. Thereby, detection covering all faces from a face of a maximum size to a face of a minimum size in the entire image of the original image IMNC is performed.

That is, the reduction of the original image IMNC to a number of pixels that can be processed by the face detector 18 prevents a face that is reduced too much and is thus crushed and undetectable from being reduced too much when the original image IMNC is divided and reduced. In addition, when the original image is cut out, an image size can be supplied as it is to the face detector 18.

It is thus possible to truly cover all faces from a face of a maximum size to a face of a minimum size in the entire image of the original image IMNC.

Incidentally, the number of divisions of the original image IMNC, a cutout position, the reduction ratio for reducing the divided images IMD1 to IMD4 to a number of pixels that can be processed by the face detector 18, and the like are set by the microcomputer 19.

In addition, the microcomputer 19 obtains results of detection performed by time-division processing, merges the face detection results after all the divided processing, and rejects face detection results when a plurality of detections of a same face at a cutout position in an overlap region OLPA are performed.

In addition, 4-part division is performed in the example of FIG. 6; however, when the number of pixels of the original image IMNC is 16 times the number of pixels that can be processed by the face detector 18 in terms of the ratio between the numbers of pixels, it suffices to perform 4-part division, and similarly perform 16-part division when faces of even smaller size are desired to be detected. It is needless to say that the number of divisions and the reduction ratio are arbitrary.

A method of shortening a detection time in the method of detecting all faces from a face of a maximum size to a face of a minimum size will next be described with reference to FIG. 7.

<Second Method: Method of Shortening Detection Time>

Figure 7:
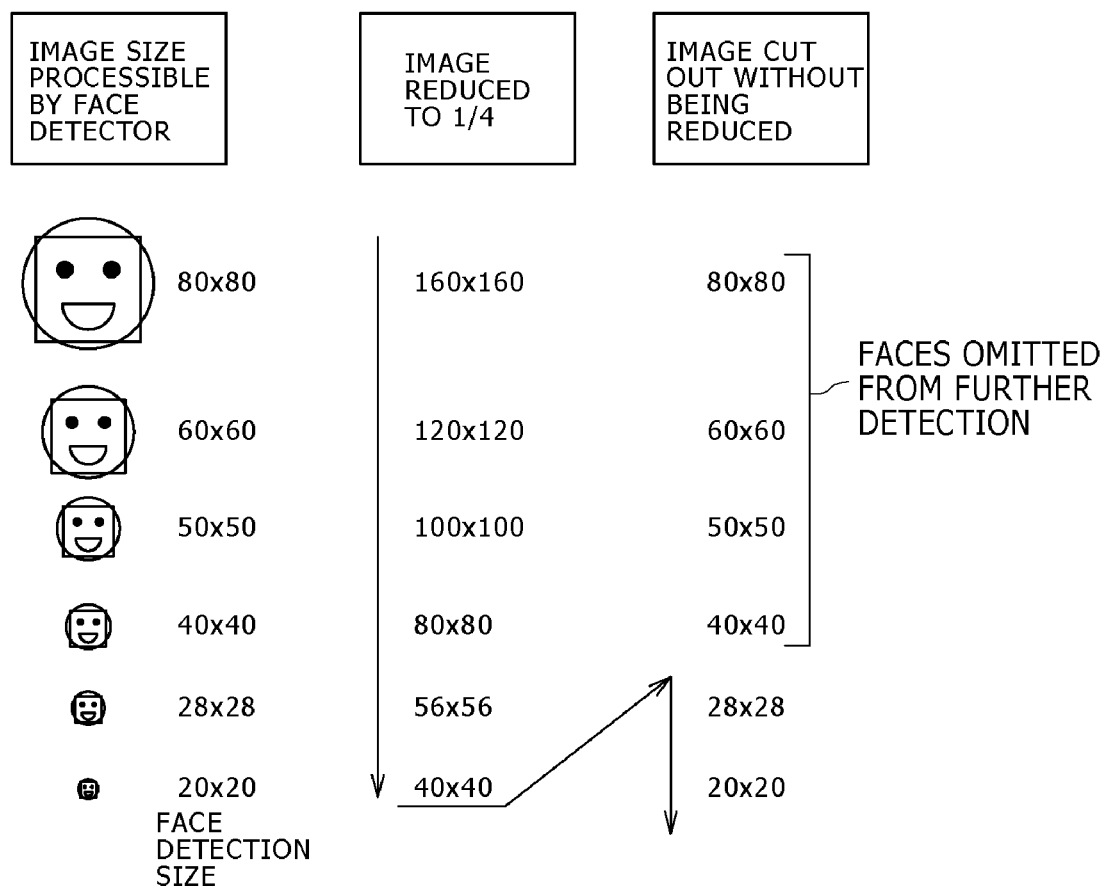
FIG. 7 is a diagram of assistance in explaining a method of shortening a detection time in a method of detecting faces covering all pixel sizes.

FIG. 7 is a diagram of assistance in explaining a method of shortening a detection time in a method of detecting faces covering all pixel sizes.

First, an original image is reduced to a number of pixels that can be processed by the face detector 18 without being divided, and faces from a maximum face size to a minimum face size detectable by the face detector 18 are detected.

Next, a setting of the face detector 18 is controlled such that at a time of detecting faces in an image divided and reduced or simply cut out, face sizes of previously performed face detection do not coincide with face sizes of face detection to be performed next, that is, only faces of small sizes are detected next.

Thereby a detection time is shortened.

FIG. 7 shows an example thereof.

In the example of FIG. 7, "80×80," "60×60," "50×50," "40×40," "28×28," and "20×20" are illustrated as face detection sizes, which are image sizes that can be processed by the face detector 18.

As face detection sizes of an image reduced to ¼, "160×160," "120×120," "100×100," "80×80," "56×56," and "40×40" are illustrated.

As face detection sizes of an image cut out without being reduced, "80×80," "60×60," "50×50," "40×40," "28×28," and "20×20" are illustrated.

In the example of FIG. 7, processing is performed as follows so that at a time of detecting faces in an image divided and reduced or simply cut out, face sizes of previously performed face detection do not coincide with face sizes of face detection to be performed next.

<1>: Detection is performed between a face of a maximum size ("160×160") and a face of a minimum size ("40×40") in an image reduced to ¼.

<2>: Only faces of smaller sizes ("28×28" and "20×20") than the face of the minimum size detectable in the above-described process of <1> are detected.

<3>: Faces of sizes "40×40" and larger have already been detected by the face detector 18 in the above-described process of <1>, and are thus omitted from the detection processing at this time.

Four-part division is performed in the example of FIG. 7; however, when the number of pixels of the original image is 16 times the number of pixels that can be processed by the face detector 18 in terms of the ratio between the numbers of pixels, it suffices to perform 1-part division, then detect only small face sizes undetectable in the 1-part division in 4-part division, and further detect only small face sizes undetectable in the 4-part division in 16-part division.

Incidentally, it is needless to say that the detected face sizes are arbitrary irrespective of the divided images or the like.

<Third Method: Detection Image Objects>

It is needless to say that the above-described face detection method may be performed with the entire image after the distortion correction as an object, and may be performed with an image not obtained by wide-angle image pickup, that is, an image free from distortion as an object, and that a similar method can be used with an output image not obtained by wide-angle image pickup, that is, an output image under image pickup conditions free from distortion as an object.

A method of shortening a detection time for a once detected face will next be described with reference to FIGS. 8 to 11.

<Fourth Method: Method of Shortening Detection Time for Once Detected Face>

Figure 8:
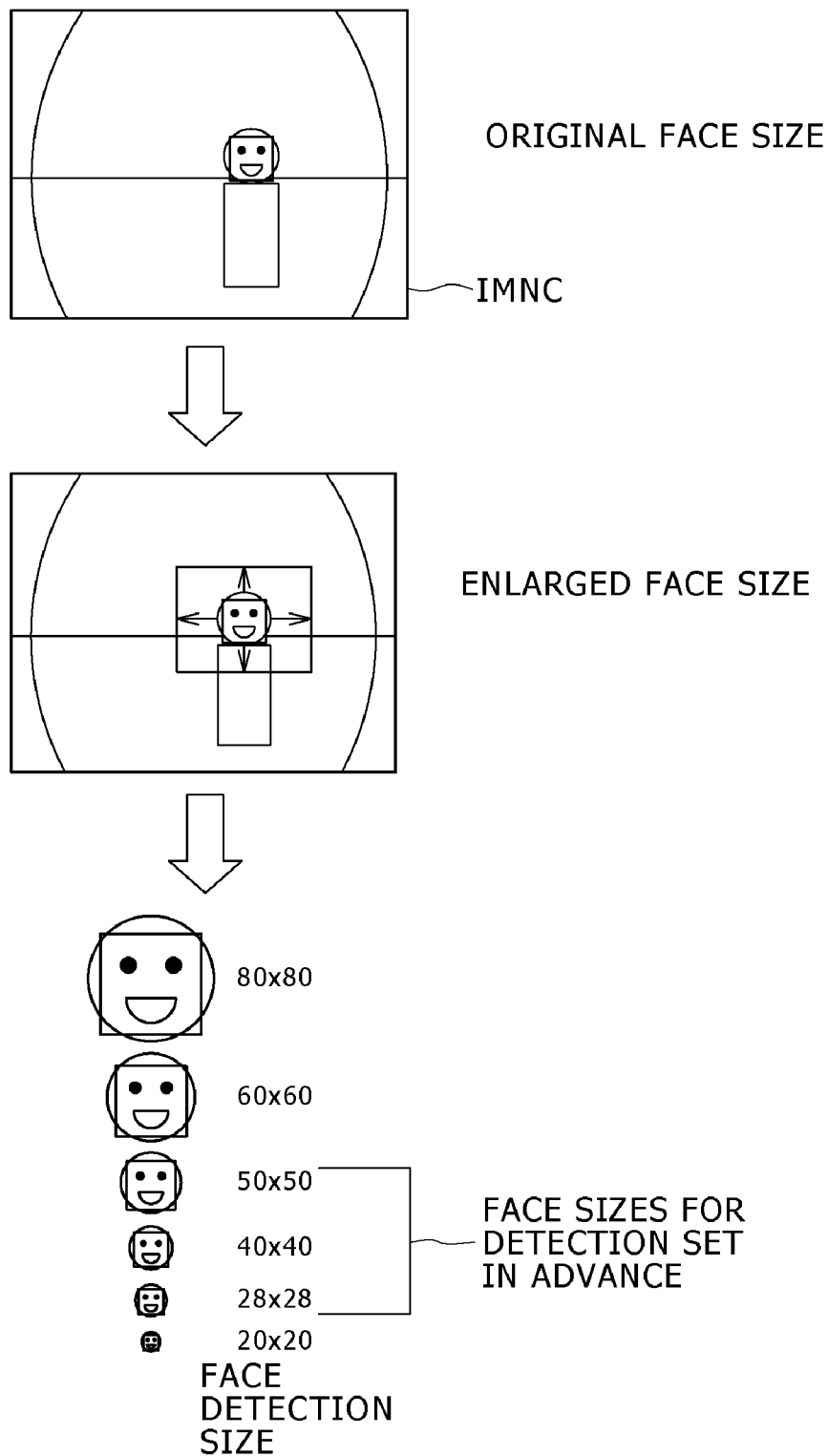
FIG. 8 is a diagram of assistance in explaining a method of shortening a detection time for a once detected face.

FIG. 8 is a diagram of assistance in explaining a method of shortening a detection time for a once detected face.

Figure 9:
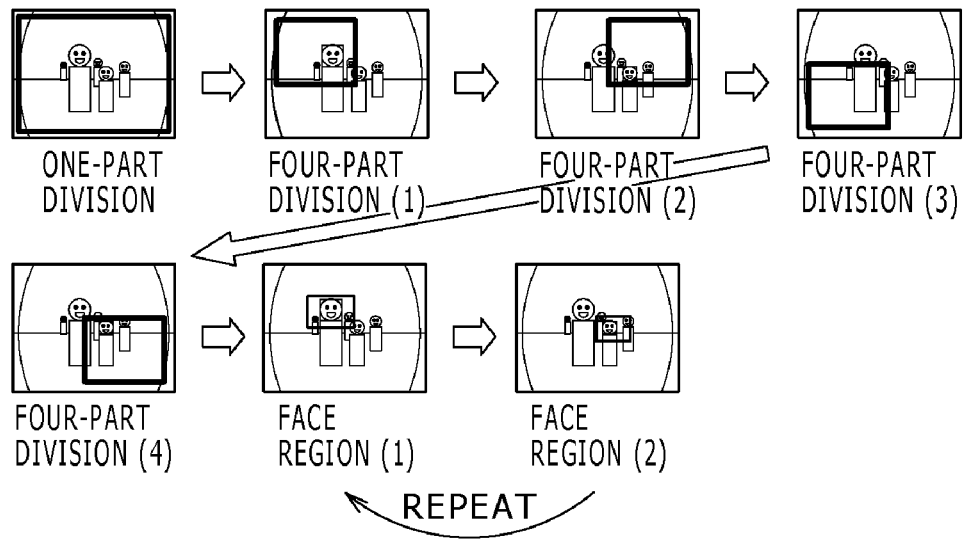
FIG. 9 is a diagram showing an example of performing division and detecting a face, and thereafter repeating face detection in the region of the face for the detected face.

FIG. 9 is a diagram showing an example of performing division and detecting a face, and thereafter repeating face detection in the region of the face for the detected face.

Figure 10:
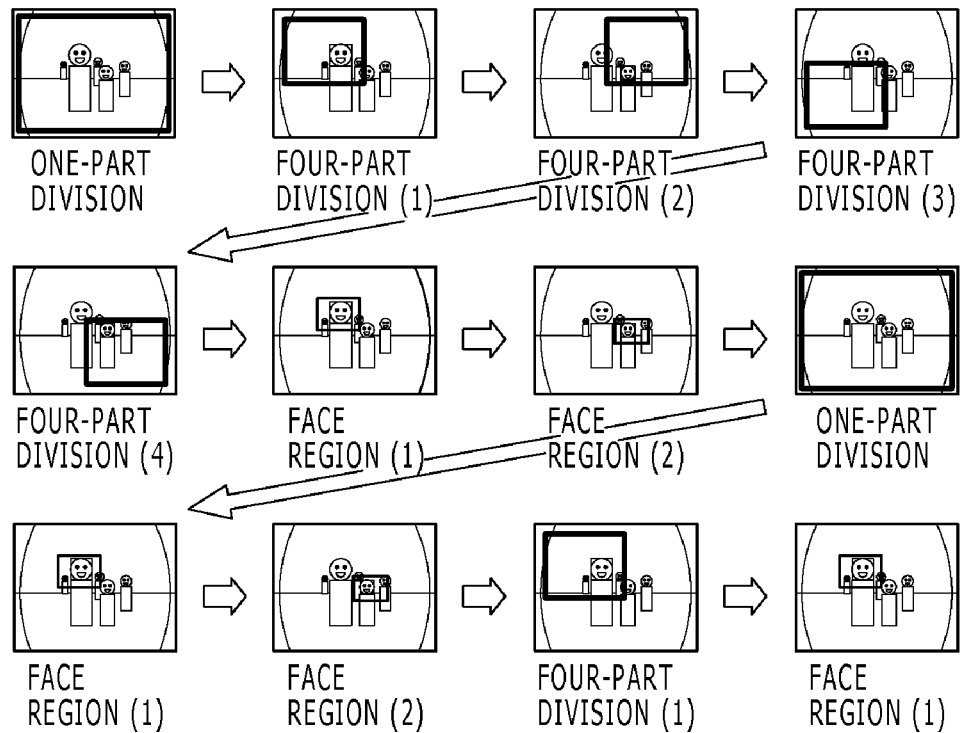
FIG. 10 is a diagram showing an example of performing division and detecting a face, and thereafter performing divided face detection in the background while performing face detection in the region of the face for the detected face.

FIG. 10 is a diagram showing an example of performing division and detecting a face, and thereafter performing divided face detection in the background while performing face detection in the region of the face for the detected face.

Figure 11:
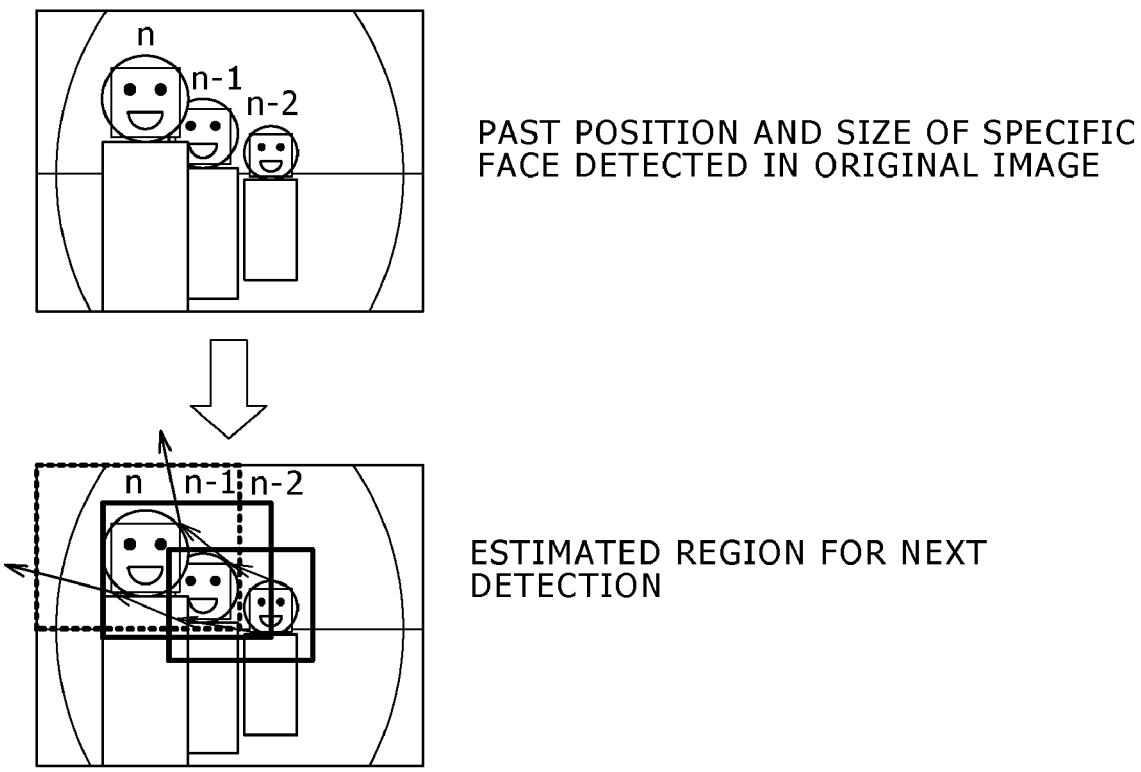
FIG. 11 is a diagram showing an example of, when detecting a specific face, estimating an amount of movement from the position and size of the face in the past in an original image, and moving a detection position and enlarging or reducing a detection region in the original image.

FIG. 11 is a diagram showing an example of, when detecting a specific face, estimating an amount of movement from the position and size of the face in the past in an original image, and moving a detection position and enlarging or reducing a detection region in the original image.

Generally, the detection of all face sizes detectable by the face detector 18 is often slower than a frame rate at which image pickup is performed by the image pickup element 12, and repeatedly using the slow detection for face detection is not practical unless a subject or a person picking up an image is not moving as in the case of a still image or the like.

Accordingly, the present embodiment shortens a detection time by performing face detection in only a peripheral image region of a face once the face is detected.

Specifically, on the basis of a position and a face size in an original image in which face detection has been performed, a detection region is determined at a ratio set in advance for the detected face size, and only (a plurality of) face sizes to be detected which face sizes are set in advance are detected. Thereafter, this is repeated (which will hereinafter be referred to as detection of specific faces).

Thereby, the detection time can be made significantly shorter than that of the above-described method of detecting all face sizes detectable by the face detector, and even in a case where a subject or a person performing image pickup is moving, a face can be detected while the subject or the person performing the image pickup is followed when the subject or the person performing the image pickup is moving at up to a certain moving speed.

FIG. 8 shows an example thereof.

In the example of FIG. 8, suppose that a face is detected while detection is performed for faces of all sizes in an original image.

In this case, a region for detecting specific faces is enlarged at a ratio set in advance for the detected face size, and a cutout region and a reduction ratio in the original image are determined.

Then, only faces of face sizes set in advance for the detected face size are detected.

In the example of FIG. 8, only faces of face sizes "50×50," "40×40," and "28×28" are detected.

Incidentally, at a point in time that the face is detected, as shown in FIG. 9, the above-described first, second, and/or third method of detecting all face sizes detectable by the face detector 18 may be stopped, or as shown in FIG. 10, detection may be continued in the background by the first, second, and/or third method on a time-division basis.

In addition, the number of faces at the time of detecting the specific faces is arbitrary.

In addition, as shown in FIG. 11, at the time of detecting a specific face, an amount of movement may be estimated from the position and size of the face in the past in the original image, and the moving of a detection position and the enlarging or reducing of a detection region in the original image may be performed.

Incidentally, it is needless to say that when a result of the estimation goes beyond the region of the original image, the detection region is of course adjusted to an edge of the original image. In addition, an arbitrary algorithm can be used for the estimation of the amount of movement at this time.

A method of shortening the detection time of the above-described first, second, and third methods by motion detection will next be described with reference to FIG. 12.

<Fifth Method: Method of Shortening Detection Time by Motion Detection>

Figure 12:
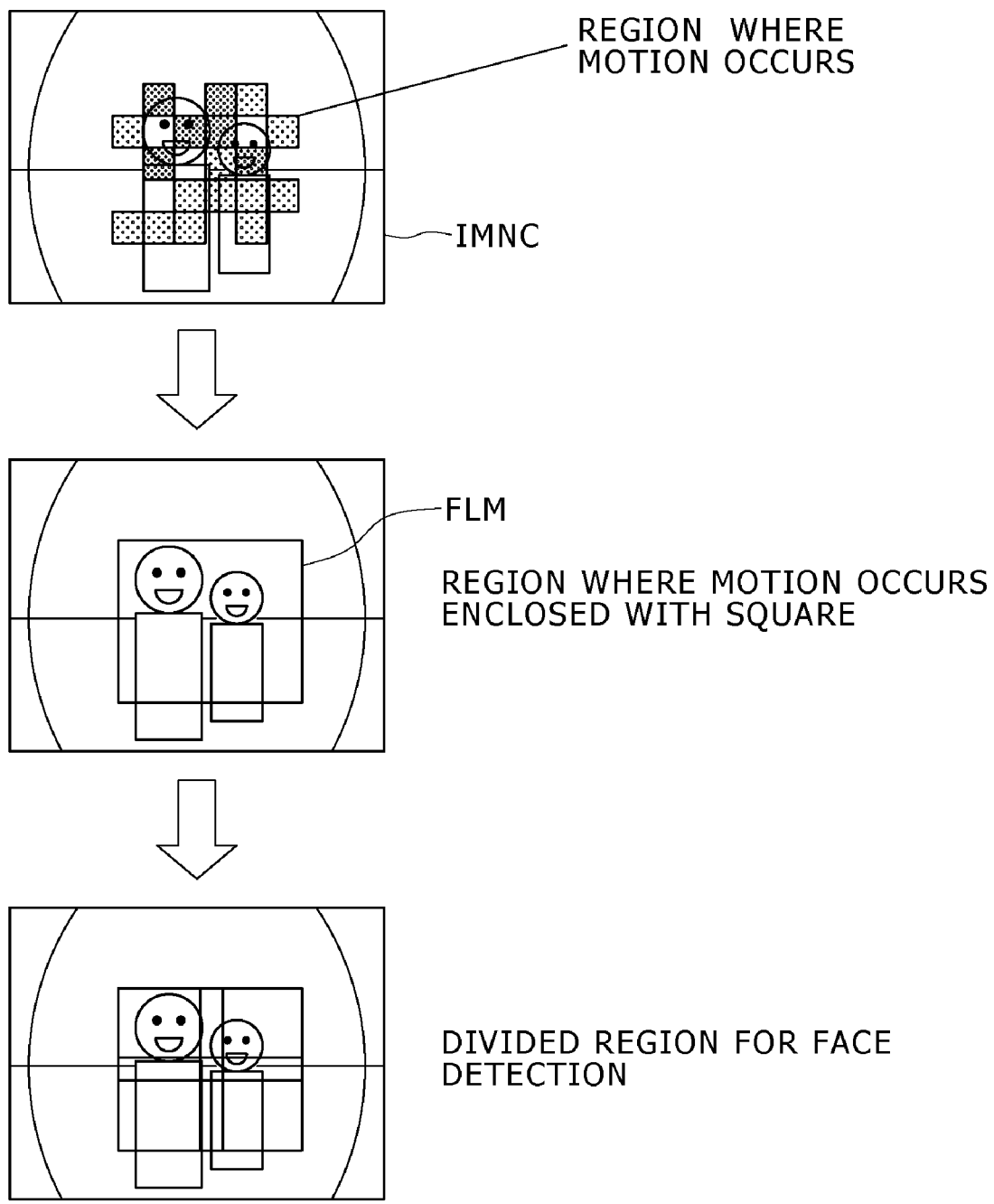
FIG. 12 is a diagram of assistance in explaining a method of shortening a detection time by motion detection.

FIG. 12 is a diagram of assistance in explaining a method of shortening the detection time by motion detection.

In face detection by the above-described first, second, and third methods, by detecting motion and limiting the face detection to a region where the motion occurs, a region for detecting faces and the number of divisions are limited, and consequently faces are detected more quickly.

Incidentally, at this time, the motion detection may be implemented by either of software and hardware, and an algorithm, a circuit configuration and the like of the motion detection may be an arbitrary one.

In addition, in this method, a result of the motion detection (a motion vector or the like) is not used for face detection.

In this case, a motion detector is taken as an example.

First, motion in an original image is detected by the motion detector.

At this time, when motion has occurred, faces in only a region where the motion has occurred are detected by the first, second, and/or third method.

Thereby, faces are not detected in all divided regions in the first, second, and/or third method. It is thus possible to greatly shorten the detection time, and perform face detection quickly from a large face size to a small face size immediately after a subject moves.

FIG. 12 shows an example thereof.

In the example of FIG. 12, motion is detected in an original image IMNC, a region where motion has occurred is enclosed by a square frame FLM, for example, and faces in only the region are detected.

In this case, the faces may be detected after the region for the face detection is divided.

Incidentally, it is needless to say that after the faces are detected by this method, the above-described fourth method may be performed.

<Detection Image Objects of Fifth Method>

It is needless to say that the fifth method may be performed with the entire image after the distortion correction as an object, and may be performed with an image not obtained by wide-angle image pickup, that is, an image free from distortion as an object, and that a similar method can be used with an output image not obtained by wide-angle image pickup, that is, an output image under image pickup conditions free from distortion as an object.

As described above, according to the present embodiment, the microcomputer (controlling section) 19 performs control so as to divide the entire image region before the distortion correction or after the distortion correction (4/9/16/25/36-part division or the like) and then supplies each of the divided images to the face detector 18 on a time-division basis. It is therefore possible to perform detection covering all faces from a face of a maximum size to a face of a minimum size in a detectable range of the face detector 18.

That is, it is possible to perform face detection covering all faces from a minimum face size to a maximum face size detectable by the face detector in a picked-up image, and detect faces of small size.

Thereby, optimum exposure control (AE and backlight correction) independent of face size is made possible, and picture quality of group photographs and the like is improved.

In addition, it is possible to increase the speed of face detection, and realize face detection improved in real-time property.

In addition, a range of detection of faces in wide-angle image pickup can be increased greatly, a use of "wide-angle image pickup+face detection" is greatly improved in practicality and marketability, and also application of the use to surveillance cameras, DSCs and the like is greatly widened.

In addition, once a face is detected, specific faces can be detected quickly, so that a real-time property is improved. Even when a person as a subject is moving, or even when a person performing image pickup is moving, it is possible to perform detection covering all faces from a face of a maximum size to a face of a minimum size in a detectable range of the face detector 18, increase the speed of the face detection, and realize the face detection improved in real-time property.

In addition, because once a face is detected, specific faces can be detected quickly, display can be made while the face is followed by an electronic pan, a tilt, or a zoom with distortion correction.

It is to be noted that the present invention can basically be intended not only for cameras capable of wide-angle image pickup but also for cameras in general regardless of presence or absence of an optical zoom, a fixed focus or the like, such as ordinary DSCs, surveillance cameras and the like.

The above-described face detecting function is also applicable to images not obtained by wide-angle image pickup, that is, images free from distortion.

In addition, the above-described face detecting function is also applicable to output images not obtained by wide-angle image pickup, that is, output images under image pickup conditions free from distortion.

When the above-described techniques are applied to this, a camera capable of detecting a face from an entire image region picked up by an imaging sensor and capable of detecting a face also from an output image (after reduction processing and the like) can be realized.

Incidentally, the methods described above in detail can also be formed as a program corresponding to the above procedures and configured to be performed by a computer such as a CPU (central processing unit) or the like.

In addition, such a program can be configured to be recorded on a recording medium such as a semiconductor memory, a magnetic disk, an optical disk, a floppy (registered trademark) disk or the like, and accessed and executed by a computer in which the recording medium is set.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
    a face detector configured to detect a face from an image given on a basis of detection information; and
    a processing unit configured to set the detection information of said face detector, receive at least an input image before distortion correction of the image before the distortion correction and an image after the distortion correction, divide an entire image region of the input image, and supply each of the divided images to said face detector on a time-division basis,
    wherein said face detector detects faces from a face of a maximum size to a face of a minimum size in the entire image in a detectable range.

2. The image processing device according to claim 1, wherein said processing unit divides said entire image region so as to have an image overlap region on a division boundary line.

3. The image processing device according to claim 1, wherein said processing unit sets said detection information including face sizes in said face detector such that detected face sizes are prevented from coinciding with each other between divided and reduced images.

4. The image processing device according to claim 1, wherein said processing unit performs control for a detected face so as to detect only a peripheral image region of the face on a basis of face detection result information obtained by said face detector.

5. The image processing device according to claim 4, wherein said processing unit has a function of setting a region for detecting a face to a range proportional to size of the face.

6. The image processing device according to claim 4, wherein said processing unit has a function of setting a region for said face detector to detect a face to a range in consideration of an amount of movement estimated from a positional relation of the face in a past.

7. The image processing device according to claim 1, wherein said processing unit controls said face detector to detect motion in the entire image region and detect a face within only a region where the motion occurs as an object.

8. The image processing device according to claim 3, wherein said processing unit controls said face detector to detect motion in the entire image region and detect a face within only a region where the motion occurs as an object.

9. The image processing device according to claim 4, wherein said processing unit controls said face detector to detect motion in the entire image region and detect a face within only a region where the motion occurs as an object.

10. A camera device comprising:
an image pickup element;
an optical system for forming an image of a subject on said image pickup element; and
an image processing device capable of subjecting an original image picked up with a wide-angle lens by said image pickup element to distortion correction using a distortion correcting parameter, wherein said image processing device includes a face detector configured to detect a face from an image given on a basis of detection information, and
a processing unit configured to set the detection information of said face detector, receive at least an input image before distortion correction of the image before the distortion correction and an image after the distortion correction, divide an entire image region of the input image, and supply each of the divided images to said face detector on a time-division basis, and
said face detector detects faces from a face of a maximum size to a face of a minimum size in the entire image in a detectable range.

11. The camera device according to claim 10, wherein said processing unit divides said entire image region so as to have an image overlap region on a division boundary line.

12. The camera device according to claim 10, wherein said processing unit sets said detection information including face sizes in said face detector such that detected face sizes are prevented from coinciding with each other between divided and reduced images.

13. The camera device according to claim 10, wherein said processing unit performs control for a detected face so as to detect only a peripheral image region of the face on a basis of face detection result information obtained by said face detector.

14. The camera device according to claim 13, wherein said processing unit has a function of setting a region for detecting a face to a range proportional to size of the face.

15. The camera device according to claim 13, wherein said processing unit has a function of setting a region for said face detector to detect a face to a range in consideration of an amount of movement estimated from a positional relation of the face in a past.

16. The camera device according to claim 10, wherein said processing unit controls said face detector to detect motion in the entire image region and detect a face within only a region where the motion occurs as an object.

17. The camera device according to claim 12, wherein said processing unit controls said face detector to detect motion in the entire image region and detect a face within only a region where the motion occurs as an object.

18. The camera device according to claim 13, wherein said processing unit controls said face detector to detect motion in the entire image region and detect a face within only a region where the motion occurs as an object.

19. An image processing method for detecting a face from an image given on a basis of detection information set in a face detector, said image processing method comprising the steps of:
setting said detection information;
dividing at least an entire image region before distortion correction of images before the distortion correction and after the distortion correction; and
supplying each of the divided images to said face detector on a time-division basis, wherein said face detector detects faces from a face of a maximum size to a face of a minimum size in the entire image in a detectable range.

20. A non-transitory computer readable medium having stored thereon computer executable image processing instructions for detecting a face from an image given on a basis of detection information set in a face detector, said image processing instructions comprising:
setting said detection information;
dividing at least an entire image region before distortion correction of images before the distortion correction and after the distortion correction; and
supplying each of the divided images to said face detector on a time-division basis,
wherein said face detector detects faces from a face of a maximum size to a face of a minimum size in the entire image in a detectable range.

* * * * *